(12) United States Patent
Richardson et al.

(10) Patent No.: US 6,655,034 B2
(45) Date of Patent: Dec. 2, 2003

(54) PLANT PROTECTOR

(75) Inventors: Andrew Richardson, Gilesgate (GB); Michael Wilson, Crook (GB)

(73) Assignee: Black & Decker Inc., Newark, DE (US)

( * ) Notice: Subject to any disclaimer, the term of this patent is extended or adjusted under 35 U.S.C. 154(b) by 56 days.

(21) Appl. No.: 09/995,954

(22) Filed: Nov. 28, 2001

(65) Prior Publication Data

US 2002/0083596 A1 Jul. 4, 2002

(30) Foreign Application Priority Data

Nov. 29, 2000 (GB) .............................................. 0029017
Dec. 14, 2000 (GB) .............................................. 0030459

(51) Int. Cl.$^7$ ........................ B26B 29/00; A01D 34/416
(52) U.S. Cl. ........................................... 30/276; 30/286
(58) Field of Search ........................ 30/276, 286, 289, 30/293, 347, 371; 56/12.7, 295; 172/13, 14; D8/8

(56) References Cited

U.S. PATENT DOCUMENTS

| 2,628,424 A | 2/1953 | McMillan et al. |
| 4,035,912 A | 7/1977 | Ballas et al. |
| 4,049,059 A | 9/1977 | Weibling |
| 4,052,789 A | 10/1977 | Ballas, Sr. |
| 4,068,376 A | 1/1978 | Briar |
| 4,161,820 A | 7/1979 | Moore |
| 4,167,812 A | 9/1979 | Moore |
| 4,183,138 A | 1/1980 | Mitchell et al. |
| 4,189,833 A | 2/1980 | Kwater |
| 4,200,978 A | 5/1980 | Irelan et al. |
| 4,211,004 A | 7/1980 | Woods |
| 4,237,610 A | 12/1980 | Bradus et al. |
| 4,362,074 A | 12/1982 | Kwater |
| 4,651,422 A | 3/1987 | Everts |
| 4,712,363 A | 12/1987 | Claborn |
| 4,756,084 A | 7/1988 | Morita |
| 4,823,464 A | 4/1989 | Gorski |
| 4,823,465 A | 4/1989 | Collins |
| 4,890,389 A | 1/1990 | Whitkop |
| 5,010,720 A | 4/1991 | Corsi |
| 5,020,223 A | 6/1991 | Desent et al. |
| 5,048,187 A | 9/1991 | Ryan |
| 5,060,383 A | 10/1991 | Ratkiewich |
| 5,077,898 A | 1/1992 | Hartwig |
| 5,107,665 A | 4/1992 | Wright |
| D344,088 S | 2/1994 | Tuggle et al. |
| 5,351,403 A | 10/1994 | Becker et al. |
| 5,446,964 A | 9/1995 | Woods et al. |
| 5,493,784 A | 2/1996 | Aiyama |
| D369,071 S | 4/1996 | Tuggle et al. |
| D372,649 S | 8/1996 | Tuggle et al. |
| D373,712 S | 9/1996 | Bridgers |
| 5,584,348 A | 12/1996 | Butler |
| 5,594,990 A | 1/1997 | Brant et al. |
| 5,615,970 A | 4/1997 | Reekie et al. |
| 5,634,322 A | 6/1997 | Woods et al. |
| 5,644,844 A | 7/1997 | Pink |

(List continued on next page.)

FOREIGN PATENT DOCUMENTS

NL           1006816        2/1999

*Primary Examiner*—Hwei-Siu Payer
(74) *Attorney, Agent, or Firm*—Harness, Dickey & Pierce, P.L.C.

(57) ABSTRACT

A string trimmer having an elongate shaft, a cutting head rotatably mounted on one end of the elongate shaft, at least one cutting member which extends from the cutting head, and a barrier which is capable of being used by an operator to move vegetation away from a path swept out by the cutting member when it rotates. The barrier is in the shape of a truncated sphere, and forms a broad band. There is further provided a guard on the string trimmer mounted on the elongate shaft which surrounds part of the rear of the path swept out by the cutting member as it rotates, wherein the barrier is mounted on the guard.

34 Claims, 10 Drawing Sheets

U.S. PATENT DOCUMENTS

| | | |
|---|---|---|
| D382,779 S | 8/1997 | Meisner et al. |
| D382,780 S | 8/1997 | Meisner et al. |
| 5,924,205 A * | 7/1999 | Sugihara et al. .............. 30/276 |
| 5,940,973 A | 8/1999 | Kitz |
| 5,950,317 A | 9/1999 | Yates et al. |
| 5,996,234 A | 12/1999 | Fowler et al. |
| 6,052,976 A | 4/2000 | Cellini et al. |
| 6,226,876 B1 * | 5/2001 | Ezell ........................... 30/276 |
| 6,324,764 B1 | 12/2001 | Watkins |
| 6,324,765 B1 | 12/2001 | Watkins, Sr. |
| 6,327,781 B1 | 12/2001 | Sinclair et al. |
| 6,327,782 B1 | 12/2001 | Blevins |
| D463,230 S * | 9/2002 | Robson .......................... D8/8 |

* cited by examiner

PLANT PROTECTOR

TECHNICAL FIELD

The present invention relates to a string trimmer and in particular to a mechanism for shielding plants from the cutting path swept out by the rotating cutting line of the string trimmer.

BACKGROUND OF THE INVENTION

SUMMARY OF THE INVENTION

String trimmers are portable hand-held outdoor gardening power tools, used for domestic and commercial grass cutting and are powered by electrical motors or small combustion engines. A string trimmer has a cutting head from which extends a cutting line, the cutting line commonly being a flexible plastic wire. The cutting line extends radially from the axis of rotation of the cutting head when it is rotatably driven by a motor. In the usual cutting mode, the cutting head and cutting line rotate a high rotational speed about an approximately vertical axis. The rotating cutting line is placed in close proximity to the grass to be cut. The grass caught within the path swept out by the rotating cutting line is severed when impacted by the cutting line.

This method of cutting grass is quick and highly effective and can be employed in dense grass or on a household lawn.

Indiscriminate cutting of soft vegetation may not be a problem when cutting in certain locations. However, the string trimmer may be used in a location where there is a mixture of soft vegetation where some parts need to be cut and other parts need to be left. One example is where the verge of a lawn abuts a flower bed containing small and delicate flowers which overhang the grass. In this example a string trimmer cannot be used easily to cut the grass without damaging overhanging flowers that are also caught in the path swept out by the rotating cutting line.

The example cited above illustrates a situation when the user wishes to protect certain plants from the rotating cutting line. There are, however, instances when the user wishes to protect the rotating cutting line from coming into contact with hard objects that the cutting line was not intended to cut, such as rocks or stones. When the rotating cutting line makes contact with such objects, it is liable to be damaged and therefore would need to be replaced. This situation is also undesirable and a device which protects certain plants from the rotating cutting line should also be capable of protecting the rotating cutting line from damaging itself against hard objects.

Prior art document EP 0 893 050 discloses a length of rigid metal wire attached to and extending outwardly from the motor housing of a string trimmer and is adapted to form a guard surrounding part of the path swept out by the rotating cutting line. EP 0 893 050 further discloses that the wire can also act as an edging guide. When acting as an edging guide, the rotating cutting line can cut a uniform edge along a lawn edge or a curb without coming into contact with the lawn edge or curb.

However, there are two problems associated with the guard disclosed in EP 0 893 050. The metal wire, when acting as a guard, does not surround the path swept out by the rotating cutting line. This leaves ample space for vegetation, such as overhanging plants or flowers, to enter into the path swept out by the rotating cutting line which results in damage to this vegetation.

Secondly, when the string trimmer is used in edging mode, the metal wire acts as a guide and therefore is unable to act as a guard. As such no protection is provided against cutting vegetation which is not intended to be cut.

Accordingly, there is provided a string trimmer comprising an elongate shaft; a cutting head rotatably mounted on one end of the elongate shaft at least one cutting member which extends from the cutting head on a barrier which is capable of being used by an operator to move vegetation away from a path swept out by the cutting member when it rotates characterised in that the barrier is in the form of a broad band.

By constructing the barrier in the manner the broad band is able to act as a shield by which the vegetation is protected from the rotary line. By utilising a broad band, the barrier has a large surface area which can make contact with the vegetation when an operator uses the barrier to prevent vegetation entering the path of the rotating cutting member the large surface area of the barrier makes contact with the vegetation. Therefore, the same pressure can be applied to vegetation to move it whilst allowing the force to be exerted over a greater area on the vegetation thereby less likely to result in damage to the vegetation.

Furthermore, the use of a broad band ensures that the vegetation is less likely to pass the barrier and enter the path swept out by cutting member.

Furthermore, the lightweight plant protector can be rotatably moved between a plurality of angular positions without the need of dismantling any part of the string trimmer. When in use, a primary function of the plant protector is to provide a barrier between overhanging plants and the path swept out by the rotating cutting line, while still allowing low level vegetation like for example grass, to pass below the lower edge of the plant protector and into the path of the rotating cutting line. The plant protector has two 'in-use' positions; one position for flat cutting and, the other for vertical edge trimming, such that when located in both 'in-use' positions the lower edge of the plant protector is approximately horizontal when the string trimmer is used in the appropriate way. The truncated spherical shell shape formed by the outer surface of the plant protector extends upwardly and arcuately from its lower edge. This outer surface provides a barrier which pushes away any overhanging plants from the path of cutting field as the string trimmer advances towards them. While protecting overhanging plants from rotating cutting line, the plant protector also protects the rotating cutting line from unnecessary contact with hard objects, like for example stone, which can damage and shorten the life span of the cutting line.

BRIEF DESCRIPTION OF THE DRAWINGS

Three embodiments of the present invention will now be described with reference to the following drawings, of which:

FIGS. 1 to 9 show the first embodiment of the invention.

DETAILED DESCRIPTION OF THE PREFERRED EMBODIMENTS

Figure 1:
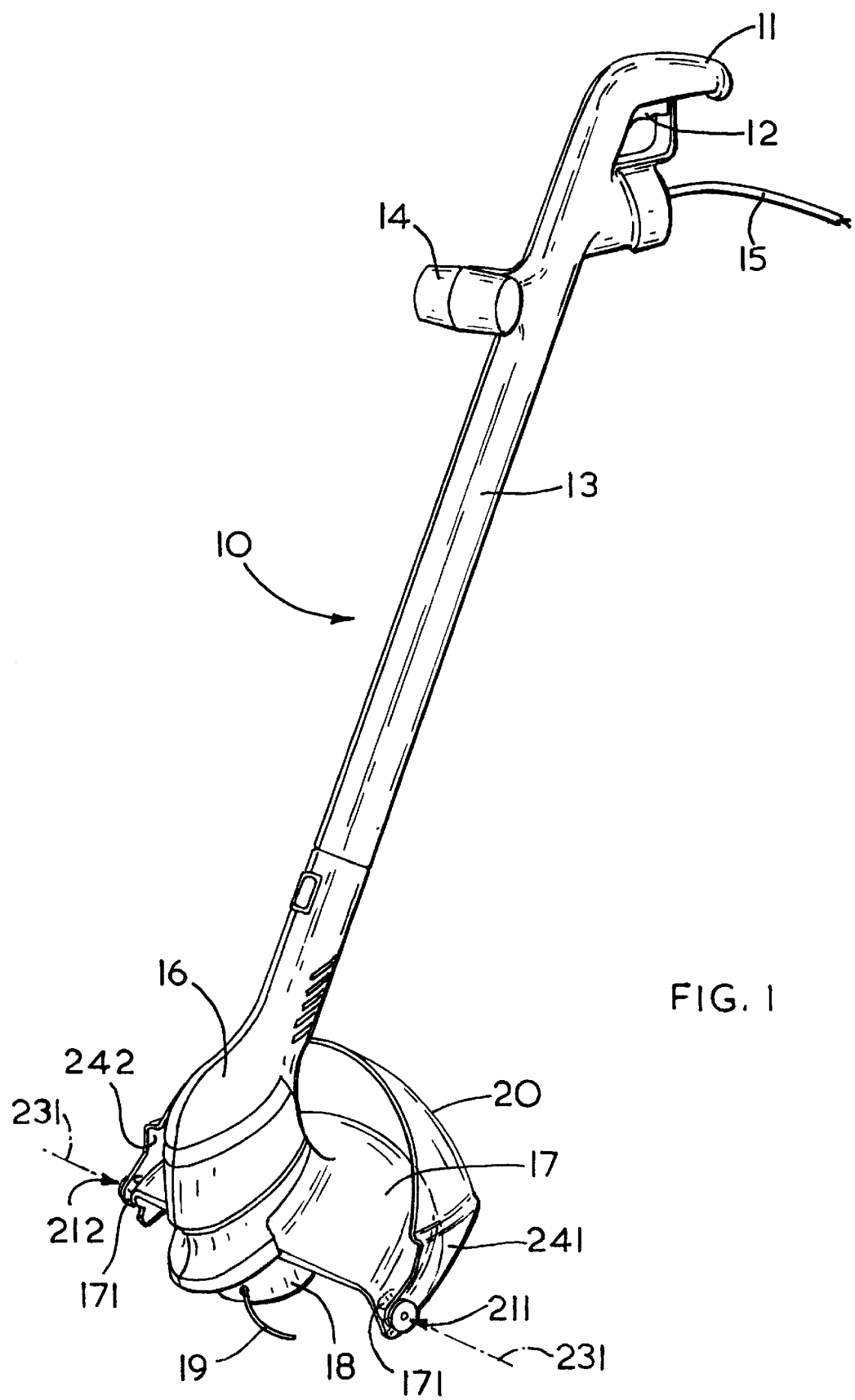
FIG. 1 shows a perspective view of a string trimmer with the plant protector in a storage position in accordance with the first embodiment.

Referring to FIG. 1, a string trimmer (10) comprises an elongate shaft (13), a rear handle (11) attached to one end of the elongate shaft (13), an electrical trigger switch (12) located below the rear handle (11), a front support handle (14) attached part way along the elongate shaft (13), an electrical cable (15) capable of carrying electrical current and entering the elongate shaft (13) at a location below the rear handle (11), a motor housing (16) attached to the other end of the elongate shaft (13) in which is mounted an electric motor (not shown), a semi-circular protection guard (17) attached to the motor housing (16) having a semi-circular edge (176), a cutting head (18) rotatingly driven by the electric motor, a cutting line (19) which extends from the cutting head (18), and a plant protector (20) pivotally attached to the protection guard (17) at two pivot points (211;212) in symmetrical fashion.

When operating the string trimmer (10) the user stands in an upright position, holding the weight of the string trimmer (10) by the rear handle (11) and directing the cutting head with the front support handle (14), the elongate shaft (13) extending downwardly from the rear handle (11) towards the motor housing (16) and the ground. The cutting head (18) is located in close proximity to, but clear of, the ground and is rotatingly driven by the electric motor when the electric motor is energised by the user. Electrical current supplied by the electrical cable (15) is supplied to the electric motor via the electrical switch (12), the electrical switch (12) connecting or disconnecting the electrical supply to the electric motor when operated by the user. When connected to the electrical current supply the electric motor is energised and rotatingly drives the cutting head (18) and the cutting line (19). Conversely, disconnection of the electrical current supply de-energises the electric motor which results in the rotation of the cutting head (18) and cutting line (19) ceasing. The cutting line (19) is a strong elongate filament, like for example, plastic wire, which extends radially from the cutting head (18). When the cutting head (18) is rotatingly driven by the electric motor, the cutting line (19) turns with the cutting head (18) about the same axis and sweep at a circular path cutting any soft vegetation, for example grass, which enters the path swept out by the rotating cutting line (19).

The protection guard (17) is part circular in shape and is adapted to surround part of the path swept out by the line on the side of the string trimmer (10) where the user normally stands during operation. By surrounding the cutting path the protection guard (17) prevents the user from accidentally placing their foot within the path of the rotating cutting line (19). The part of the path swept out by the cutting line on the other side of the motor housing (16) is exposed so that any grass or soft vegetation falling within the path will be cut.

Figure 2:
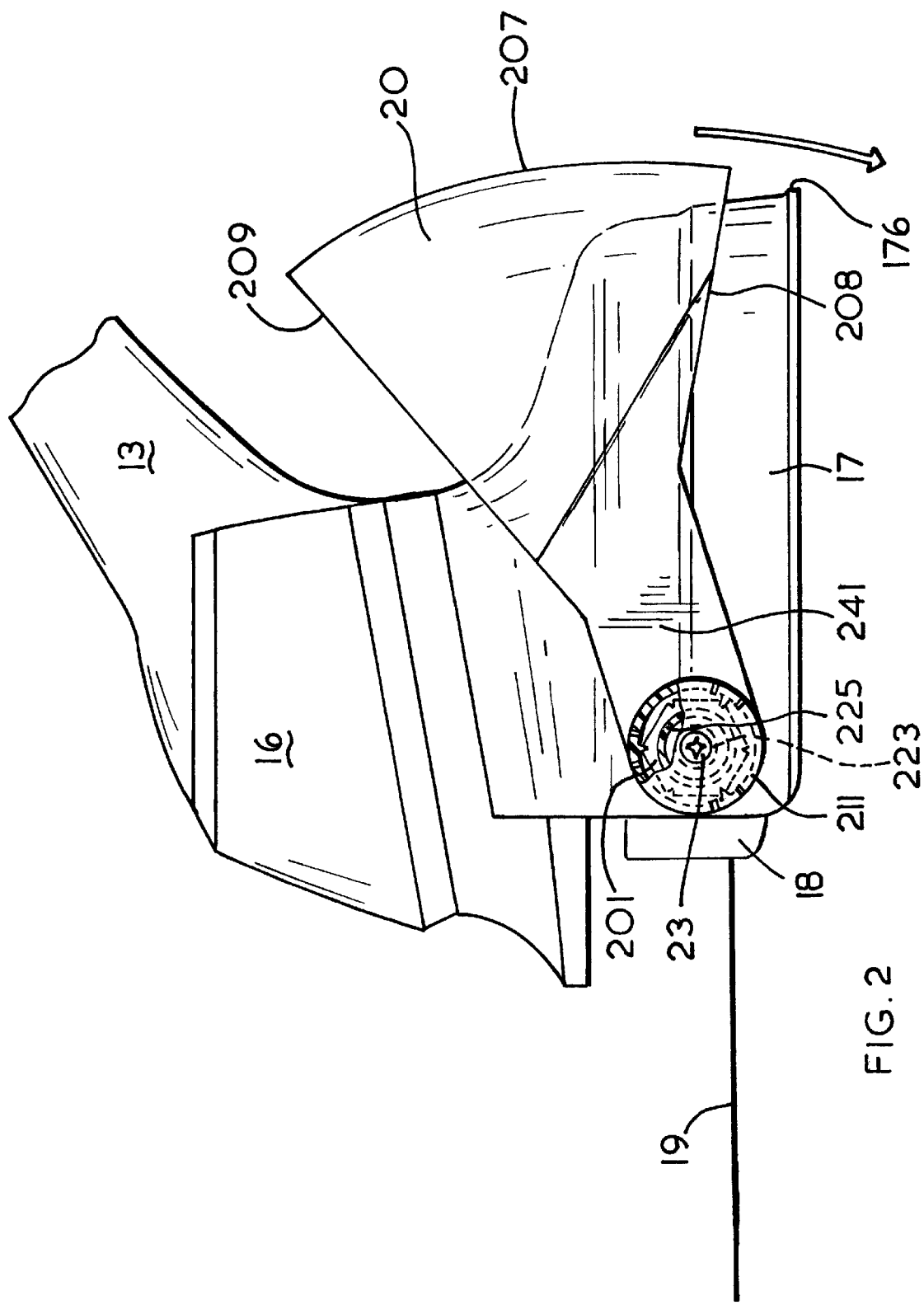
FIG. 2 shows a side view of the motor housing and guard of the string trimmer in cutting mode with the plant protector in a storage position.
Figure 4:
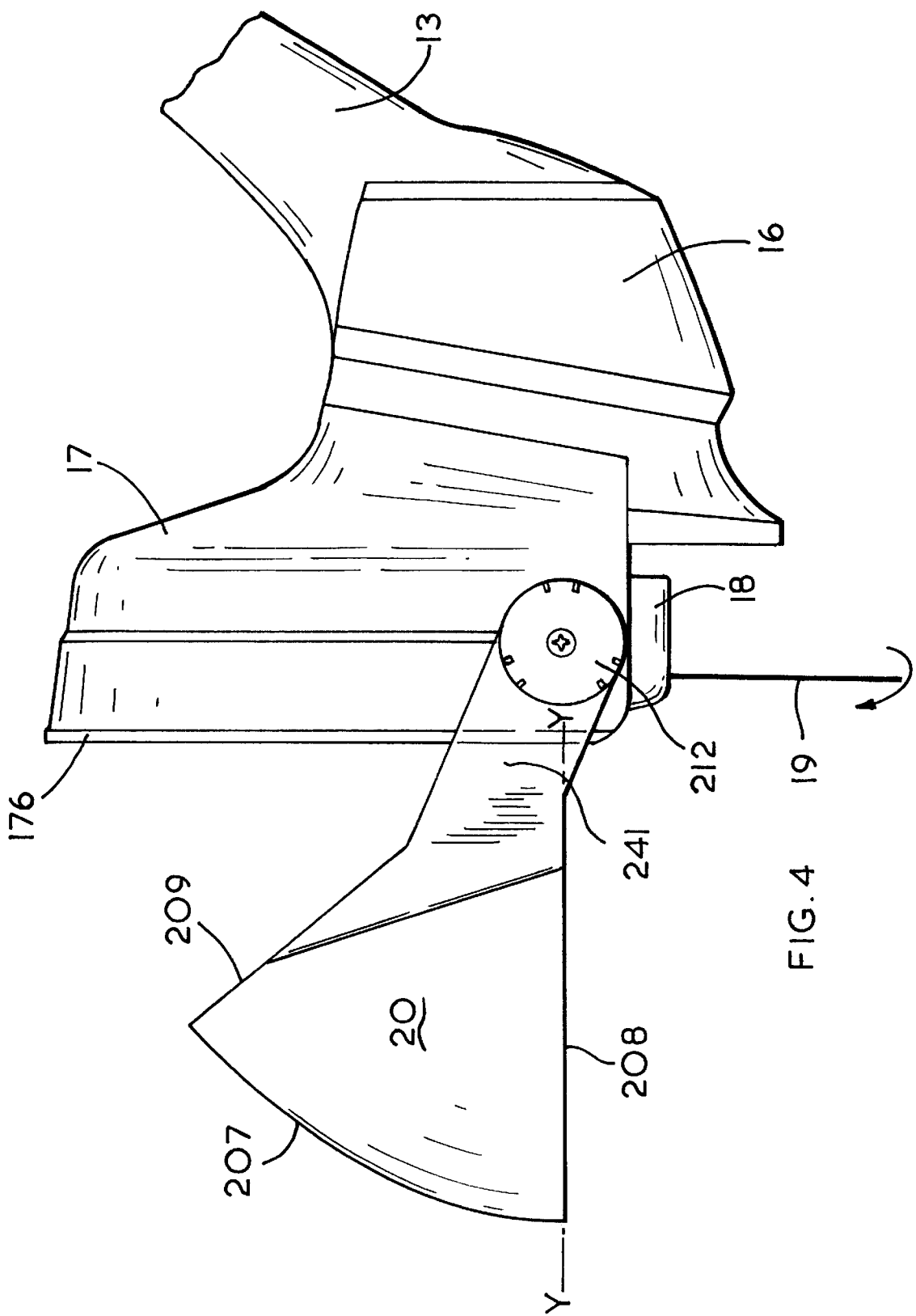
FIG. 4 shows a side view of the motor housing and guard of the string trimmer in edging mode with the plant protector in the "vertical edge cutting" position.

The plant protector (20) is mounted so that it pivots about an axis which perpendicular to the axis of rotation of the cutting head (18) when it is in its flat cutting position as shown in FIG. 2 and also when it is in its vertical edge cutting position as shown in FIG. 4.

The plant protector (20) is able to be pivoted from a first position (not shown) where it is adjacent the elongate shaft (13) located just forwards of the elongate shaft (13) through an angle of over 270° first to a position forward of the string trimmer (see FIG. 3) to a position below the string trimmer (not shown), to a position rearward of the string trimmer (see FIG. 2) and to a second position (not shown) adjacent the elongate shaft (13), however, now being located just to the rear of the elongate shaft.

Referring to FIG. 2, the plant protector (20) is made of transparent plastics material and comprises, a body (207), a first elongate side member (241), and a second symmetrical elongate side member (242). The first side member (241) is located on one side of the body (207) and extends from the body (207) to the first pivot point (211). The second side member (242) is located on the other side of the body (207) and extends from the body (207) to the second pivot point (212) in symmetrical fashion to the first side member (241).

Figure 6:
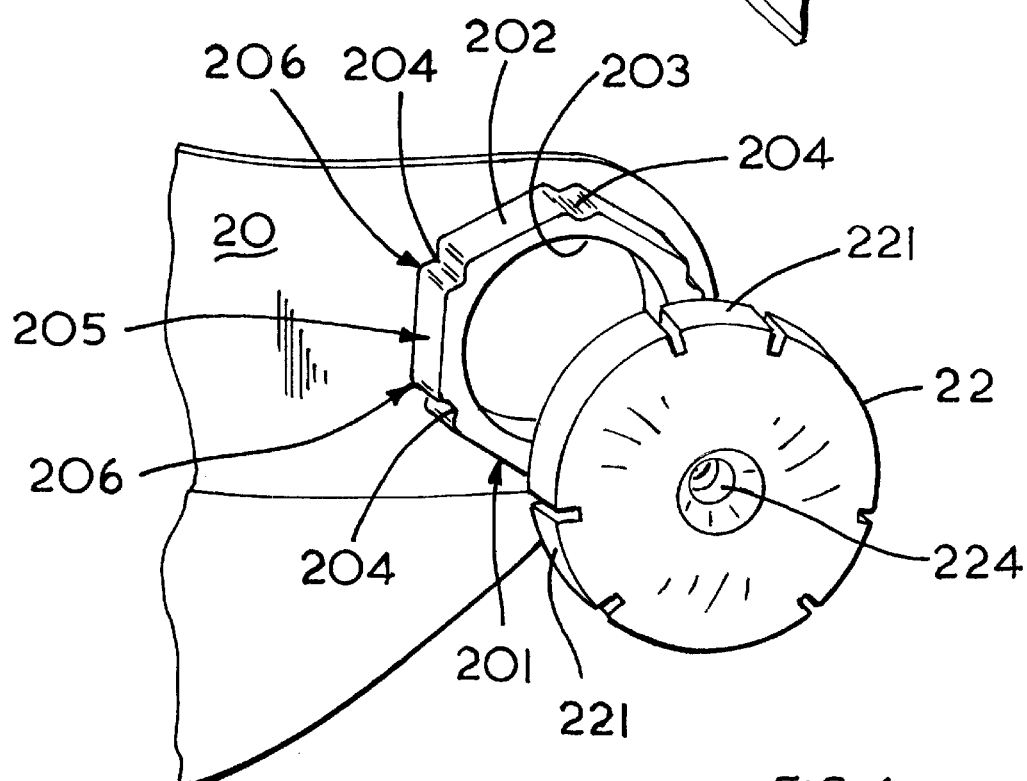
FIG. 6 shows an exploded view of the cap and part of the plant protector from the other side to that shown in FIG. 5.
Figure 7:
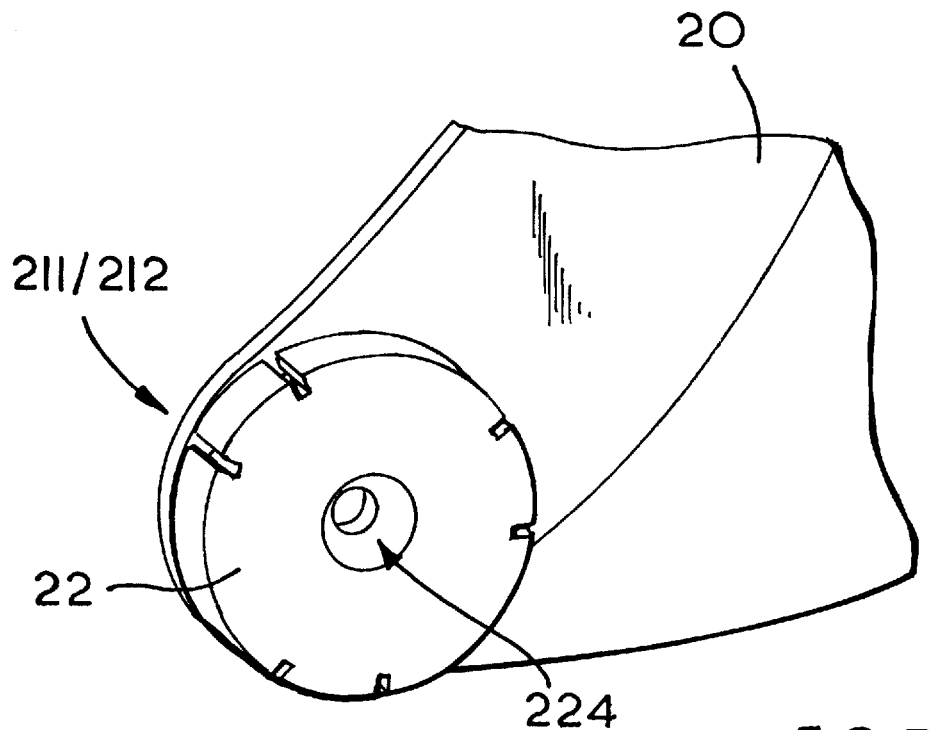
FIG. 7 shows a view of the cap and part of the plant protector when assembled from the same side as that shown in FIG. 6.
Figure 8:
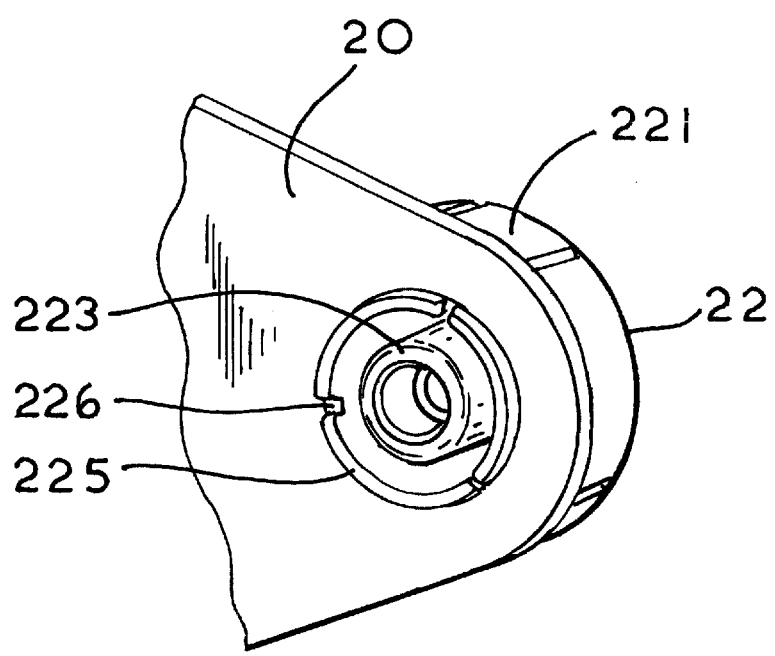
FIG. 8 shows a view of the cap and part of the plant protector when assembled from the other side as that shown in FIG. 7.
Figure 9:
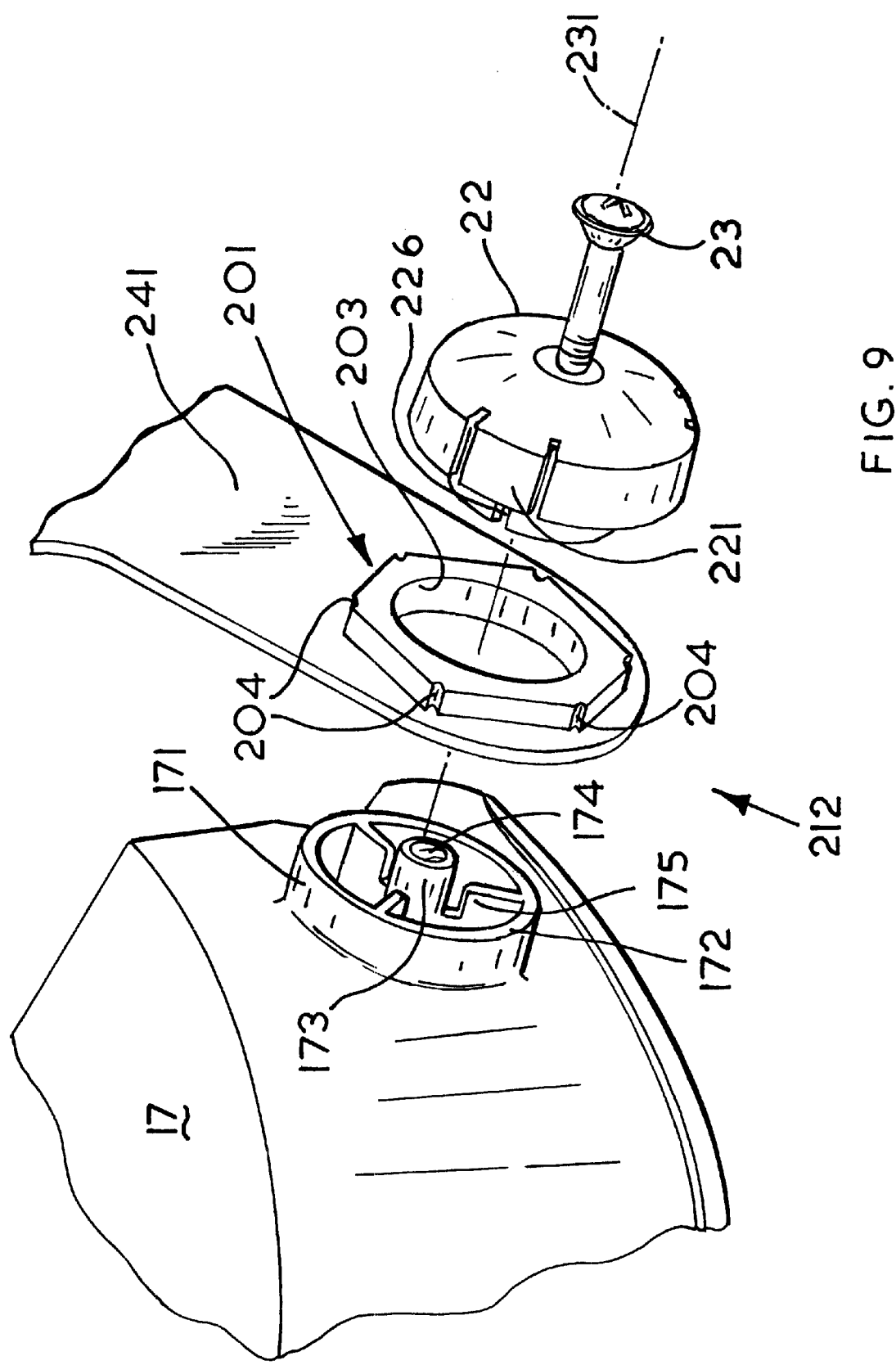
FIG. 9 shows an exploded view of cap and guard.

The first (241) and second (242) side members each have a hexagonal collar (201) located at the end of the side member away from the body (207) as shown in FIG. 6. The hexagonal collar (201) of the first (241) and second (242) side members form part of the first (211) and second (212) pivot points respectively. The body (207) is similar in shape to a motor cycle crash helmet visor. The body (207) has a first edge (208), and a second edge (209), each edge describing an arc. The radius of the spherical section of the body (207) is sufficiently greater than the outer radius of the protection guard (17) so that the plant protector (20) can rotate about the pivot points (211;212) through its full range of pivotal movement without making contact with the protection guard (17) as best shown in FIG. 2. The first (211) and second (212) pivot points act together as both pivotal support and latch mechanism for the plant protector (20). The pivot points (211 ;212) are capable of releasably latching the plant protector (20) in up to six different predetermined pivotal stationary positions, or allowing rotational movement of the plant protector (20) in relation to the guard (17) when urged by the user. In particular, the pivot points (211;212) are formed so that three of the six stationary positions can hold the plant protector in either a 'storage' (FIG. 2), a 'trimming' (FIG. 3) or an 'edge cutting' (FIG. 4) position.

Figure 3:
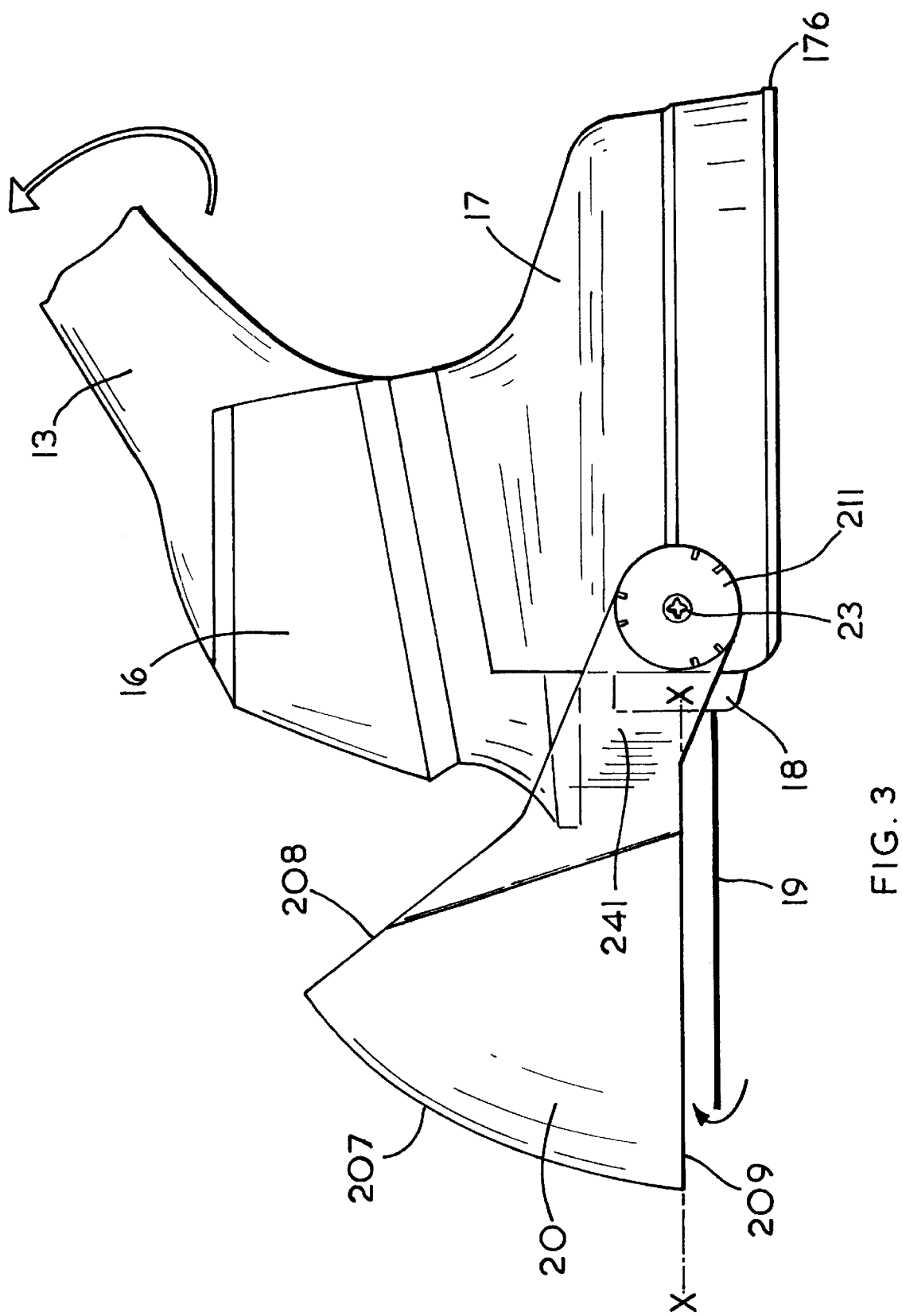
FIG. 3 shows a side view of the motor housing and guard of the string trimmer in cutting mode with the plant protector in the "flat cutting" position.

There now follows a description, with reference to FIGS. 2 to 4, of the plant protector (20) located in these three stationary positions.

FIG. 2 shows the plant protector (20) in the "storage" position. The body (207) of the plant protector (20) is located behind the guard (17) and above semi-circular edge (176). In the storage position the plant protector (20) surrounds part of the rear outer surface of the protection guard (17), the protection guard (17) surrounding approximately half the circular path swept out by the rotating cutting line (19). The plant protector (20) is not in use when located in the storage position.

FIG. 3 shows the plant protector (20) in the "trimming" position where the plant protector (20) projects forward of the string trimmer. The body (207) of the plant protector (20) is located at the front of the motor housing (16) and projects forward. The second edge (209), as viewed from the side in FIG. 3, is located in a plane X—X, the plane X—X being substantially parallel to the ground and being the closest part of the plant protector (20) to the rotating cutting line (19). The path swept out by the rotating cutting line (19) is also parallel to the ground and is located just beneath the plant protector (20). The rotating cutting line (19) is located closer to the ground than the edge (209) in order to cut low-level vegetation like, for example, grass while other overhanging plants are pushed away by the body (207) of the plant protector (20) and therefore protected from the rotating cutting line (19).

FIG. 4 shows the plant protector (20) in the "edge cutting" position where the plant protector is still projecting forward of the string trimmer. The cutting head (18) of the string trimmer (10) is orientated so that the path swept out by the rotating cutting line (19) is vertical. When the path swept out by the rotating cutting line (19) is vertical, the string trimmer can be used to cut grass overhanging the vertical edge of a grass lawn adjoining a flower bed. The motor housing (16) is located on the grass lawn side of the path swept out by the rotating cutting line (19), and the plant protector (20) is located on the opposite side of the path swept above the flower bed. The first edge (208), as viewed from the side in FIG. 4, is located within a plane Y—Y, the plane Y—Y being parallel to the ground and being perpendicular to the path swept out by the rotating cutting line (19). In the "edge cutting" position the plant protector (17) acts as a shield surrounding part of the upper half of the path swept out by the rotating cutting line (19) thereby protecting those plants and flowers rooted in the flower bed and overhanging the vertical edge of the lawn from the rotating cutting line (19).

The first (211) and second (212) pivot points are located on opposite sides of the guard (17) and are constructed in the same manner. A description of the construction of the plant protector of the first pivot point (211) is equally applicable to the construction of the second pivot point (212). The construction of the first pivot point (211) will now be described with reference to FIGS. 5 to 9.

Figure 5:
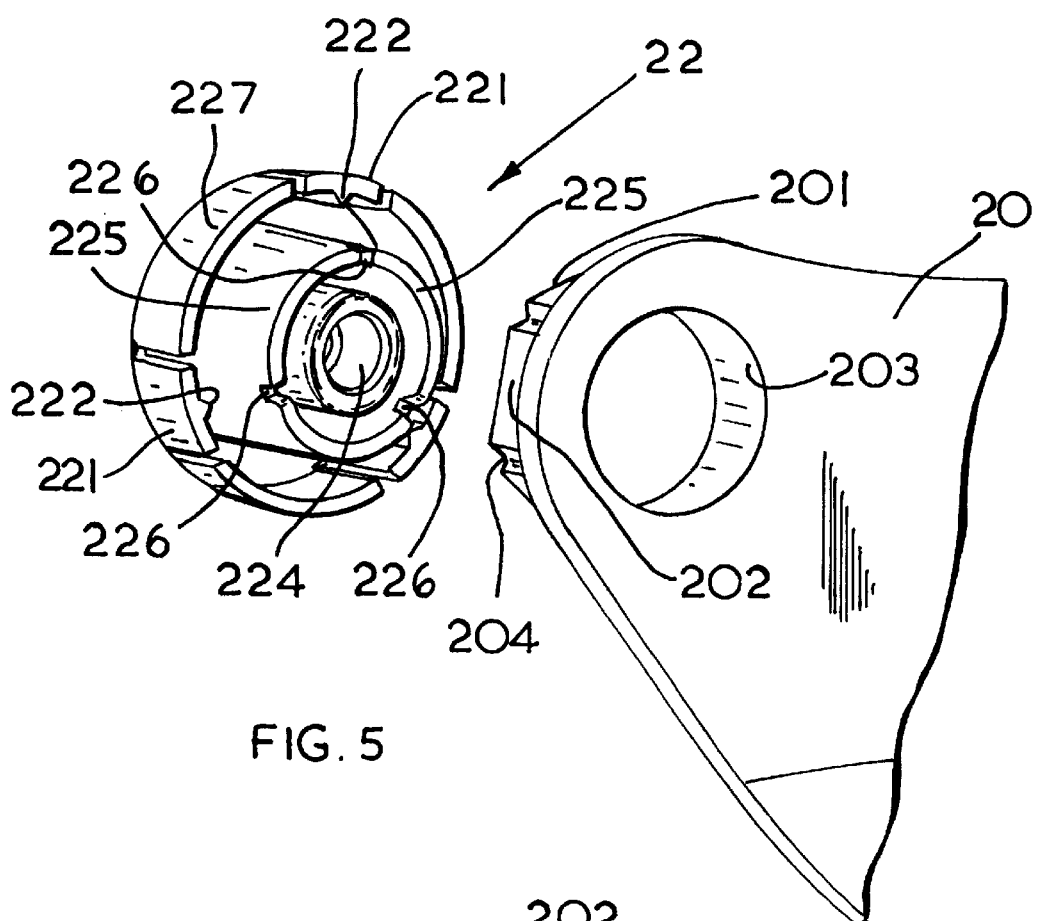
FIG. 5 shows an exploded view of the cap and part of the plant protector from one side.

The pivot point (211) comprises:
  a raised section (171) moulded into the protection guard (17), the raised section (171) comprising an outer circular ridge (172), a central hub (173) having a threaded aperture (174), and three shoulders (175) extending radially in from the circular ridge (172) to the central hub (173) (see FIG. 9);
  a) a hexagonal collar (201) moulded into the plant protector (20) having a circular internal aperture (203), the hexagonal collar (201) having six outer flats (202) inter-posed by six 'v'-shaped troughs (204), the flats (202) each comprising a mid-point (205) and two extreme-ends (206), an extreme-end (206) being formed at the transitional point between a flat (202) and its adjacent trough (204) (see FIG. 6);
  b) a circular cap (22) made of resilient material, comprising a perimeter wall (227) and three tongues (221), wherein the three tongues (221) form part of the perimeter wall (227), each of which is capable of resilient deformation and each one has a protrusion (222). The circular cap (22) further comprises a central collar (223) forming an aperture (224) and an annular raised portion (225) located in the annular space between the collar (223) and the perimeter wall (227). The annular raised portion (225) has three grooves (226) on its outer surface. Each of the three grooves (226) is adapted to simultaneously receive one of the three shoulders (175) when the pivot point (211) is assembled (see FIG. 5);
  c) a threaded bolt (23) forming the axis of rotation (231) of the pivot point (211).
  d) Assembly of the pivot point (211) is a three stage process:

Firstly unite the cap (22) and the plant protector (20) so that the raised portion (225) of the cap (22) is received by the aperture (203) on the plant protector (20) (as shown by FIG. 5) and the hexagonal collar (201) is received by the annular trough located between the annular raised portion (225) and the perimeter wall (227) of the cap (22) (as shown in FIGS. 5 and 6), such that each protrusion (222) makes contact with the mid-point (205) of one of the flats (202) without resilient deformation of the tongue (221).

Secondly, unite both the cap (22) and the plant protector (20) with the guard (17) so that the hub (173) of the guard (17) is received by the aperture (224) of the cap and the raised portion (225) engages with the three shoulders (175), such that each shoulder (175) is received by one of the three grooves (226) in the raised portion (225) thereby preventing rotational movement of the cap (22) relative to the plant protector (20).

Thirdly, securely fix the cap (22) to the guard (17) with the bolt (23) which engages with threaded aperture (174) of the guard (17).

The pivot points (211;212), once assembled, allow rotational movement of the plant protector (20) relative to the guard (17) and the cap (22), subject to interaction between the protrusions (222) on the tongues (221) and the troughs (204). The six flats (202) and six troughs (204) of the hexagonal collar (201) form part of, and move with, the plant protector (20). Each flat (202) is arranged so that the distance between its mid-point (205) and the axis of rotation (231) is smaller than the distance between one of its extreme ends (206) and the axis of rotation (231). When a protrusion (222) makes contact at the mid-point (205) of an adjacent flat (202) the tongue (221) on which is mounted that protrusion is not deformed. However, should a protrusion (222) slide towards an extreme end (206) of that same flat (202), due to rotation of the plant protector (20) relative to the guard (17) and the cap (22), then the protrusion (222) is pushed radially outwards and away from the axis of rotation (231) due to contact with the flat (202) and, resiliently deforms its tongue (221). The resilient nature of the tongue (221) resists the sliding of the protrusion (222) from the mid-point (205) to the extreme-end (206).

Moving the protrusion (222) further from the mid-point (205) and beyond the extreme-end (206) engages the protrusion (222) with a 'v'-shaped trough (204). The distance between the bottom of the trough (204) and the axis of rotation (231) is smaller than the distance between the extreme-end (206) and the axis of rotation (231), therefore the deformation of the tongue (221) is reduced once the protrusion (222) passes the extreme-end (206) and engages with the trough (204). Once the protrusion (222) is engaged with the trough (204) the resilient nature of its tongue (221) resists movement of the protrusion (222) from the trough (204).

The protrusions (222), the flats (202) and the troughs (204) are all mutually aligned so that if one protrusion (222) is engaged with a trough (204) then each of the other two protrusions (222) are simultaneously engaged with the other troughs (204). Equally, if one protrusion (222) is located at the mid-point (205) of a flat (202) then each of the other protrusions (222) is simultaneously located at the mid-point (205) of a flat (202), and so on. The first (211) and second (212) pivot points resist relative rotational movement between the guard (17) and the plant protector (20) because this involves the protrusions (222) moving from one trough (204) to engage with another trough (204).

This acts as a latch mechanism, only allowing rotational movement of the protrusions (222) between two troughs (204) when a sufficient rotational force exerted by the user is great enough to overcome the resilient force of the tongues (221). Conversely, the effect of gravity upon the mass of the plant protector (20) does not exert a great enough rotational force about the axis of rotation (231) to overcome the resilient force of the tongues (221) and cause rotational movement of the protrusions (222) between two troughs (204). Therefore the first (211) and second (212) pivot points hold the plant protector (20) stationary in relation to the protection guard (17) in any one of six positions provided each protrusion (222) is engaged with a trough (204). These six positions are pre-determined by the orientation of six troughs (204) relative to the plant protector (20).

During its life, a string trimmer risks being stored for a long time with the plant protector (20) positioned relative to the protection guard (17) in such a way that the protrusions (222) are not engaged with a trough (204). In such a case, each protrusion (222) must instead be located somewhere upon the surface of an adjacent flat (202). This location may be the extreme end (206) of the flat (202) causing continual deformation of the tongue (221). Over time, continual deformation of the resilient material forming the tongues (221) may result in plastic deformation of the tongues (221). Once plastically deformed, the tongues (221) loose their resilience and are unable to fully engage their protrusions (222) with the troughs (204). Once this has happened, the holding force of first (211) and second (212) pivot points is reduced. In cases of extreme deformation the effect of gravity upon the mass of the plant protector (20) can be sufficient to exert a great enough rotational force about the axis of rotation (231) to overcome the what remains of resilient force of the tongues (221).

In this embodiment such a risk is reduced due to the inclusion of the flats (202) between the troughs (204). If each protrusion (222) is located at one extreme end (206) of the flat (202) then the protrusion (222) and hence the tongue tends to slide along the surface from the extreme end (206) to the mid-point (202) reducing distance between the axis of rotation (231) and protrusion. The tongue (221) is resiliently deformed when its protrusion (222) is located at one extreme end (206). However, the same tongue (221) is not deformed when its protrusion (222) is located either at the mid-point (202) or is engaged with one of the troughs (204). If a string trimmer is stored with each protrusion (222) located at one extreme end (206) then, the resilient nature of the tongue (221) urges its protrusion (222) to slide towards the mid-point (205) of the same flat (202) where the tongue (221) is no longer deformed. The use of flats (202) between troughs (204) provides a means of reducing the likelihood that the tongues (221) do not become plastically deformed. Therefore, the performance of the latching mechanism is less likely to deteriorate over time.

Though FIG. 3 shows the plant protector (20) located above the cutting line (19), the plant protector can be pivoted downwardly so that it surrounds the front half of the path swept out by the cutting line. When in this position, the protrusions (222) are engaged with the flats (202).

The same reference numbers have been used to describe the second embodiment as the first embodiment except where the design has been changed.

The second embodiment of the present invention will now be described with reference to FIGS. 10 and 11.

Figure 11:
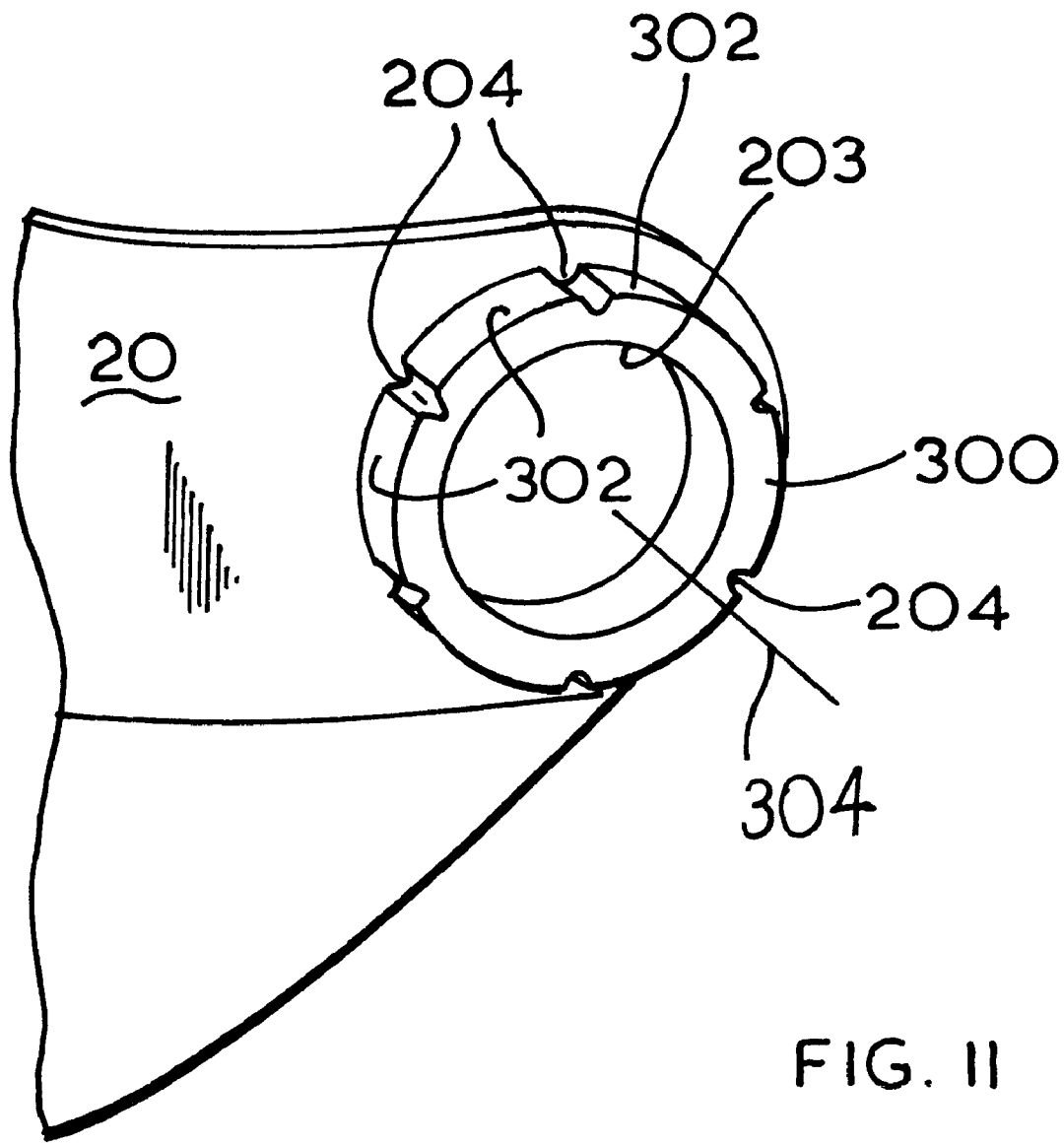
FIG. 11 shows a view of part of the plant protector showing the circular collar.

The design of the second embodiment of the present invention is the same as that of the first embodiment except that the hexagonal collar (201) on the plant protector of the first embodiment of the invention has been replaced by a circular collar (300) as shown in FIG. 11. The circular collar (300) comprises six flats (302) which are curved, each flat (302) having a radius of curvature about the axis (304) which passes through the centre of the collar (300) and which is the same as the other flats (302). Between each pair of flats (302) is located a trough (204), there being six troughs in total.

The second embodiment of the present invention works in the same manner as the first embodiment. When the protrusion (222) on the tongue (221) of the cap (22) is rotated from a position where it is engaged with a trough (204) to a position where it engages with a flat (302), the tongue resiliently deforms outwardly. However as the protrusion continues to rotate relative to the circular collar (300) it slides along the surface of the flat (302) of the circular collar (300), the amount of deformation of the tongue (221) remaining constant as it slides along the flat (302) until it reaches the next trough where it engages with the trough to latch the pivot mechanism and hence the plant protector into a latched position.

Figure 10:
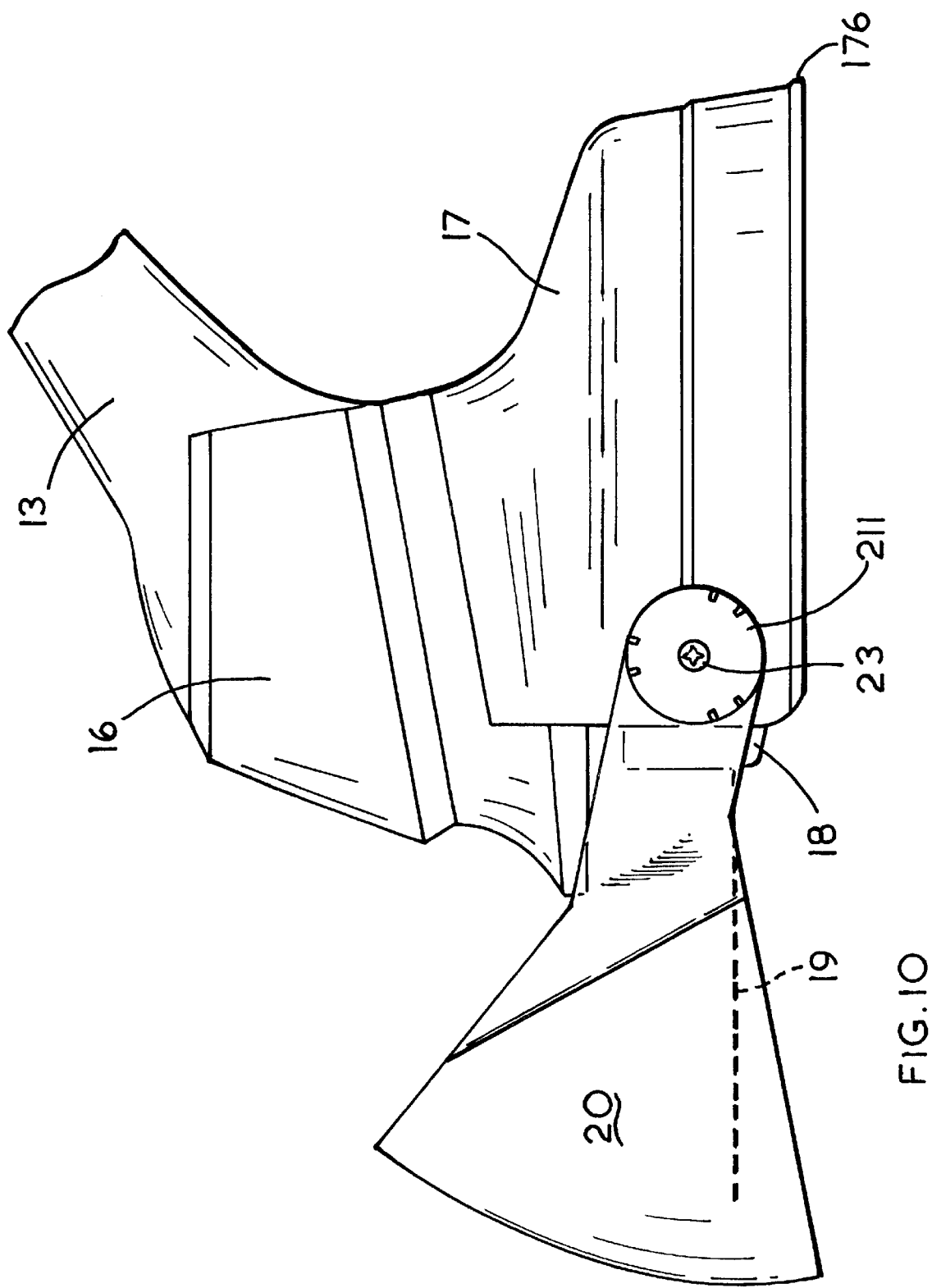
FIG. 10 shows a side view of the motor housing and guard of the string trimmer in a cutting mode with the plant protector in a position where it surrounds the edge of the path swept out by cutting line in accordance with the second embodiment of the invention.

The orientation of the troughs (204) about the axis (304) has been varied in the second embodiment to that of the first so that when the plant protector is in a forward projecting position in front of the cutting head (18) and the protrusions (222) are engaged with the troughs (204), it surrounds the front edge of the path swept out by the cutting line (19) when it rotates as shown in FIG. 10.

Figure 12:
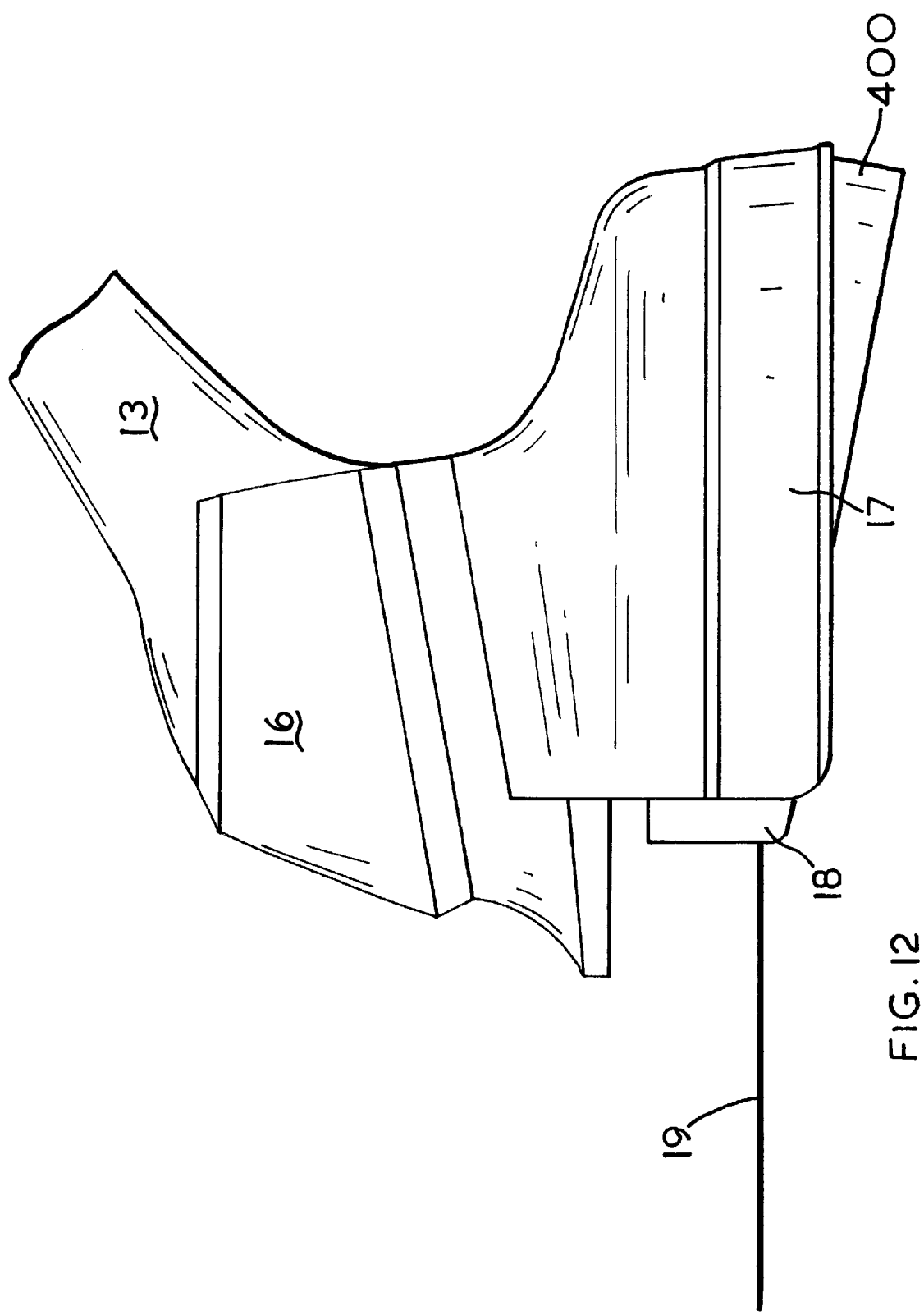
FIG. 12 shows a side view of the motor housing and guard of a string trimmer in cutting mode with the plant protector in the storage position according to the third embodiment of the present invention.

The design of the third embodiment of the present invention will be described with reference to FIG. 12 and is the same as that of the first embodiment except for the fact that the plant protector is mounted at its pivot points on the inside of the wall of the protection guard (17). Except for the plant protector (400) the same reference numbers have been used in FIG. 12 as those used to describe the first embodiment. The guard (17) is part circular in shape and is adapted to surround part of the rear of the path swept out by the rotating cutting line. The pivot points (not shown) are constructed in the same manner as those described in the first embodiment, the raised sector mould into the guard facing inwardly towards the cutting head (18), the hexagonal collar on the plant protector and the cap being located with the space surrounded by the guard.

The radius of the plant protector (400) is less than that of the wall of the guard (17) but greater than that of the path swept out by the rotating cutting line.

The plant protector latchably pivots in the same manner as that of the first embodiment.

However, when the plant protector is pivoted to the "storage position" the top part of the plant protector locates to a position within the protection guard but surrounding the path swept out by the rotating cutting line.

It will be obvious to a person skilled in the art to reduce the width of the plant protector sufficient so that it is entirely located within the space surrounded by the guard when located in the "storage position".

What is claimed is:

1. A string trimmer comprising:
   an elongate shaft;
   a cutting head rotatably mounted on one end of the elongate shaft;
   at least one cutting member which extends from the cutting head;
   a barrier which is capable of being used by an operator to move vegetation away from a path swept out by the cutting member when it rotates, and wherein the barrier comprises a broad band; and
   a guard mounted on the elongate shaft which surrounds at least part of a rear portion of a path swept out by said cutting member as said cutting member rotates, and wherein said barrier is mounted on said guard.

2. A string trimmer as claimed in claim 1, wherein the barrier is in the shape of a truncated sphere.

3. A string trimmer as claimed in claim 1, wherein at least part of the barrier is transparent.

4. A string trimmer as claimed in claim 3, wherein a substantial part of the barrier is transparent.

5. A string trimmer as claimed in claim 1, wherein the barrier is capable of projecting forward of the cutting head.

6. A string trimmer as claimed in claim 1, wherein the barrier is of suitable width so that it is capable of surrounding the edge of the path swept out by the cutting member when it rotates.

7. A string trimmer as claimed in claim 1, wherein the band curves around from a first attachment point to a second attachment point.

8. A string trimmer as claimed in claim 1, wherein the barrier is pivotally mounted about a single pivot axis on the string trimmer and, when the cutting head is rotating in a flat position is capable of pivoting from a position, above the path swept out by the cutting member to a position below the path swept out by the cutting member without passing through the path swept out by the cutting member.

9. A string trimmer as claimed in claim 8, wherein the axis of pivot is substantially perpendicular to the axis of rotation of the cutting head when the cutting head is in a flat cutting position.

10. A string trimmer as claimed in claim 8, wherein the axis of pivot of the band is substantially perpendicular to the axis of rotation of the cutting head when the cutting head is in a vertical edge cutting position.

11. A string trimmer as claimed in claims 8, wherein the barrier is capable of pivoting through at least 270°.

12. A string trimmer as claimed in claim 8, wherein the barrier is capable of pivoting from a first position where it is located on one side of the elongate shaft to a second position where it is located on the other side of the elongate shaft.

13. A string trimmer as claimed in claim 8, wherein the barrier has suitable dimensions so that it is capable of surrounding the edge of the path swept out by the cutting member when it is rotating.

14. A string trimmer as claimed in claim 8, wherein the barrier is capable of pivoting to a position wherein it projects forward of the string trimmer.

15. A string trimmer as claimed in claim 8, wherein the barrier is capable of pivoting to a position where it projects downwardly from the string trimmer.

16. A string trimmer as claimed in claim 8, wherein the barrier is capable of pivoting to a position wherein it projects rearwardly from the string trimmer.

17. A string trimmer as claimed in claim 8, wherein, the barrier is capable of pivoting to a position where it surrounds a rear portion of the guard.

18. A string trimmer as claimed in claim 17, wherein the barrier is pivotally mounted on the guard.

19. A string trimmer as claimed in claim 8, wherein said barrier is pivotally mounted on the string trimmer at each of its ends by pivot mechanisms.

20. A string trimmer as claimed in claim 8, wherein the barrier can be latched in a plurality of predetermined angular positions.

21. A string trimmer as claimed in claim 20, wherein the barrier can be latched in six predetermined angular positions.

22. A string trimmer as claimed in claim 8, wherein the band is pivotally mounted at each of its ends.

23. A string trimmer as claimed in claim 22, where the band curves from one pivot point around to the other pivot point.

24. A string trimmer as claimed in claim 8, further comprising a pivot mechanism including a latching mechanism about which the barrier is capable of latchably rotating relative to the string trimmer.

25. A string trimmer as claimed in claim 24, wherein there is provided two pivot mechanisms.

26. A string trimmer as claimed in claim 24, wherein the latching mechanism is capable of holding the barrier stationary relative to the string trimmer in at least one predetermined angular position.

27. A string trimmer as claimed in claim 24, wherein the latching mechanism comprises:
   a first member having a wall, the wall comprising at least one flat and at least one trough;
   a second member held in rotational contact with the first member having at least one resilient tongue;
   the resilient tongue having a protrusion which is engaged with and capable of sliding along the wall as the first member rotates in relation to the second member so that it is either in contact with the trough or the flat, the tongue resiliently deforming as it slides along the wall depending on its position in relation to the wall; and
   wherein the barrier rotates relative to the string trimmer, the first member rotates in relation to the second member causing the protrusion to slide onto the wall, the latching mechanism latching the barrier in a predetermined position when the protrusion engages with the trough.

28. A vegetation trimmer comprising:
   an elongate shaft;
   a cutting head rotatably mounted on one end of the elongate shaft;
   a cutting member supported from said cutting head;
   a guard supported by said elongate shaft for partially covering said cutting member as said cutting member rotates;
   a barrier mounted on said guard for moving vegetation away from a path swept out by said cutting member as said cutting member rotates, said barrier forming an arcuate band, and
   wherein said barrier is movable from a first position disposed rearwardly of said guard so as to be inoperable, to a second position forwardly of said guard so as to be operable.

29. The vegetation trimmer of claim 28, wherein said barrier is pivotally supported from said guard.

30. A vegetation trimmer comprising:
   an elongate shaft;
   a cutting head rotatably mounted on one end of said elongate shaft;

a cutting member supported from said cutting head;

a guard supported by said elongate shaft for partially covering a path swept by said cutting member;

a barrier forming a band mounted on said guard, said barrier being pivotally movable from a first position disposed underneath said elongate shaft when said vegetation trimmer is being held in a position by a user, to a second position disposed forwardly of said elongate shaft for use.

31. The vegetation trimmer of claim 30, wherein said barrier is movable pivotally between said first and second positions.

32. The vegetation trimmer of claim 30, wherein said barrier is movable between at least three pre-defined positions.

33. The vegetation trimmer of claim 30, further comprising a pivot mechanism for pivoting said barrier between said first and second positions.

34. The vegetation trimmer of claim 33, wherein said pivot mechanism comprises cooperating components for holding said barrier at each of said first and second positions.

* * * * *